(12) United States Patent
Gonzales et al.

(10) Patent No.: US 8,049,585 B2
(45) Date of Patent: Nov. 1, 2011

(54) VEHICLE POWER SYSTEM AND ELECTRICAL CONTACTOR FOR USE WITH SAME

(75) Inventors: Philip Michael Gonzales, Dearborn, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 12/546,126

(22) Filed: Aug. 24, 2009

(65) Prior Publication Data

US 2011/0043307 A1    Feb. 24, 2011

(51) Int. Cl.
*H01F 7/08* (2006.01)
*B60L 1/00* (2006.01)

(52) U.S. Cl. ......... 335/259; 307/9.1; 307/113; 307/139; 307/140; 307/142; 307/143

(58) Field of Classification Search .................. 335/259, 335/264, 265, 267; 307/9.1, 10.1, 10.6–10.8, 307/113, 139–143, 147
See application file for complete search history.

(56) References Cited

U.S. PATENT DOCUMENTS

| | | | | |
|---|---|---|---|---|
| 2,336,871 A | * | 12/1943 | Lake | 335/259 |
| 3,914,720 A | * | 10/1975 | Drubig | 335/14 |
| 3,923,116 A | | 12/1975 | Thomspon et al. | |
| 5,369,540 A | | 11/1994 | Konrad et al. | |
| 5,547,017 A | | 8/1996 | Rudd | |
| 5,661,274 A | | 8/1997 | Koehler | |
| 6,486,571 B1 | | 11/2002 | Miller et al. | |
| 6,861,607 B2 | | 3/2005 | Kwong | |
| 7,205,496 B2 | | 4/2007 | Schober et al. | |

* cited by examiner

*Primary Examiner* — Ramon Barrera
(74) *Attorney, Agent, or Firm* — David B. Kelley; Brooks Kushman P.C.

(57) ABSTRACT

A vehicle power system includes an electrical power source, an electrical bus, and a contactor electrically connected with the electrical power source and electrical bus. The contactor includes first and second poles, dual plungers each operatively associated with one of the first and second poles, and an electromagnetic coil configured to cause at least one of the dual plungers to move if the coil is energized.

13 Claims, 3 Drawing Sheets

VEHICLE POWER SYSTEM AND ELECTRICAL CONTACTOR FOR USE WITH SAME

BACKGROUND

U.S. Pat. No. 7,205,496 to Schober et al. discloses a subminiature switch including a housing, an actuator and terminals. The actuator protrudes from the housing at a position offset from the center of the housing. The terminals are electrically coupled with fixed contacts positioned within the housing. A contact maker is moved via the actuator and held in a first or second switching position by means of a bistable spring arrangement. An additional component, a separator or auxiliary actuator, is in snap-fit engagement with the cover of the housing and is pushed through by the actuator as the switch is operated. The contact point of the fixed contacts is on a side of the housing which is opposite the actuator. The separator or auxiliary actuator is moved in the direction of the contact position by the actuator.

U.S. Pat. No. 6,486,571 to Miller et al. discloses a circuit for connecting a power distribution bus to a battery. The circuit has a connector circuit and a switch. The battery has a positive battery terminal and a negative battery terminal. The switch has a control terminal, a first terminal, and a second terminal. A contactor circuit is coupled between the battery and the power distribution bus. The contactor circuit has a solenoid and a plunger switch that is operably coupled by the solenoid. In one embodiment, the connector circuit has a switch used to allow the connector terminals to be coupled at different times to the circuit. In a second embodiment, different length terminals may be used to enable coupling of the battery terminals at different times.

U.S. Pat. No. 5,661,274 to Koehler discloses a double-pole single-throw switch that has a pair of spaced stationary contacts adapted for carrying current to individual circuits. A cantilevered, torsionally flexible, electrical current carrying arm has a pair of correspondingly spaced moveable contacts mounted on the free end and disposed adjacent the stationary contacts. A toggle spring actuator has one reaction end engaging a slot in the end of the electrical current carrying arm for effecting relative lost motion movement and impacting the sides of the slot for causing rapid making and breaking and a wiping motion of the contacts. The spring engages the slot midway between the contacts to permit angular movement to accommodate misalignment of the stationary contacts.

SUMMARY

An automotive vehicle includes an electrical power source disposed within the vehicle, an electrical bus, and a double-pole, single-throw contactor electrically connected with the electrical power source and electrical bus. The contactor includes two poles and a split plunger configured to sequentially close the poles.

A vehicle power system includes an electrical power source, an electrical bus, and a contactor electrically connected with the electrical power source and electrical bus. The contactor includes first and second poles, dual plungers each operatively associated with one of the first and second poles, and an electromagnetic coil configured to cause at least one of the dual plungers to move if the coil is energized.

A double-pole single-throw contactor includes two poles, dual plungers and an electromagnetic coil wound around the dual plungers. Each of the dual plungers is configured to independently close one of the two poles.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
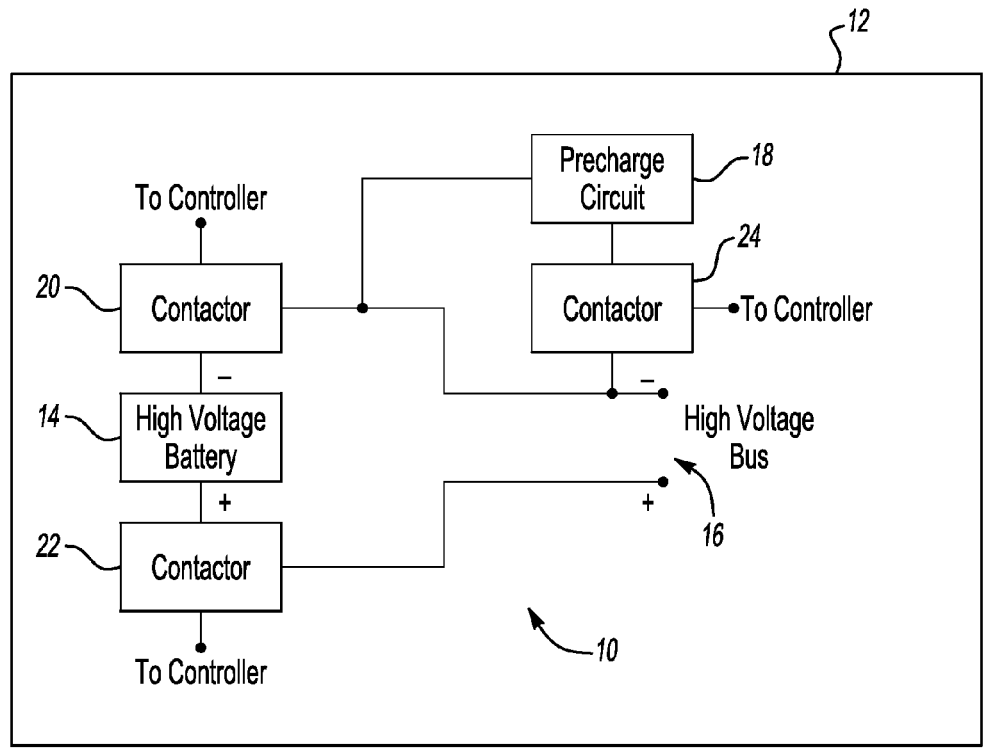
FIG. 1 is a block diagram of an automotive power system.

Referring to FIG. 1, an automotive power system 10 for a vehicle 12 may include a high voltage power source 14 (e.g., +300 V battery, ultra capacitor, etc.), high voltage bus 16, precharge circuit 18 and contactors 20, 22, 24 (e.g., switches). As known in the art, the high voltage bus 16 may supply power from the high voltage battery 14 to various loads, such as an electric machine, etc.

The contactor 20 is electrically connected with the battery's low (negative) side and the high voltage bus 16. The contactor 22 is electrically connected with the battery's high (positive) side and the high voltage bus 16. The contactor 24 is electrically connected with the high voltage bus 16 and the precharge circuit 18. The contractors 20, 22, 24 may be selectively opened or closed under the control of one or more controllers (not shown) in a known fashion.

To precharge the system 10, the contactor 20 is closed and the contactor 24 is subsequently closed as known in the art. Precharge of the system 10 is complete when, for example, the voltage across the contactor 24 falls within some acceptable limit (e.g., 20 V), and a predetermined period of time (e.g., 150 msec) has passed. The period of time may be determined based on vehicle test data, etc. Once the system 10 has been precharged, the high side contactor 22 is closed and the contactor 24 is subsequently opened. Electrical power may then flow from the high voltage battery 14 to loads electrically connected with the high voltage bus 16.

Each of the contactors 20, 22, 24 may be relatively expensive and add considerable material cost to the vehicle 12. A reduction in the number of contactors may, therefore, result in a reduction of material cost to the vehicle 12.

Figure 2:
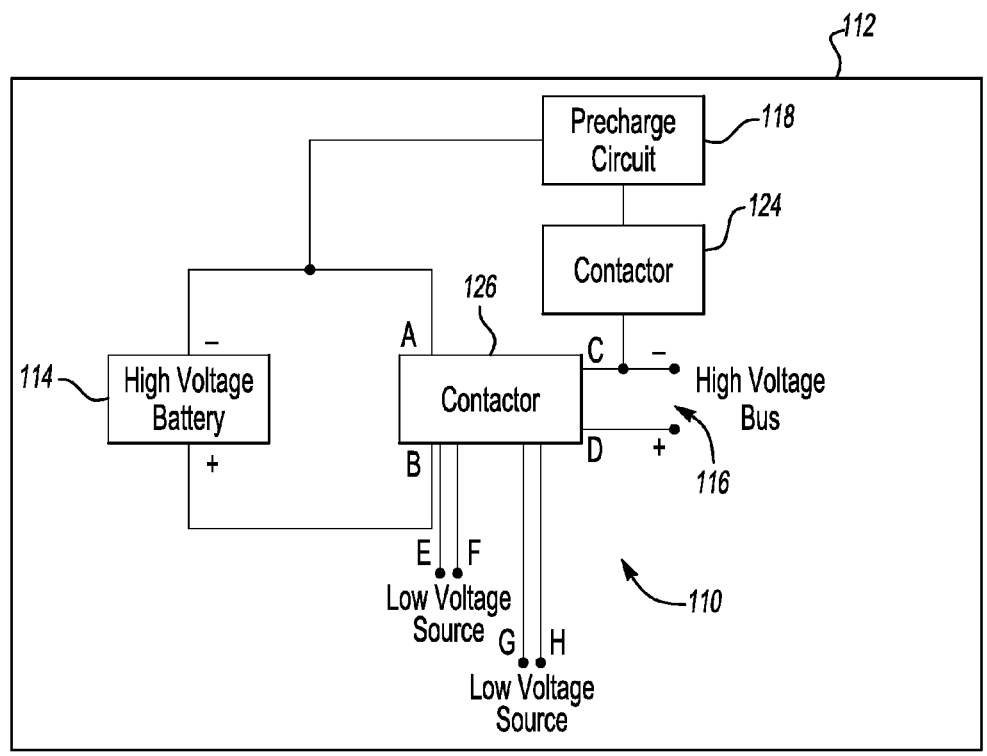
FIG. 2 is a block diagram of another automotive power system.

Referring now to FIG. 2, numerals of FIG. 2 that differ by 100 relative to the numerals of FIG. 1 are used to designate similar elements in FIG. 2. Unlike the system 10 of FIG. 1, a single contactor 126 has been electrically connected between the high voltage battery 114 and the high voltage bus 116. The system 110 thus has only two contactors as opposed to three.

Figure 3A:
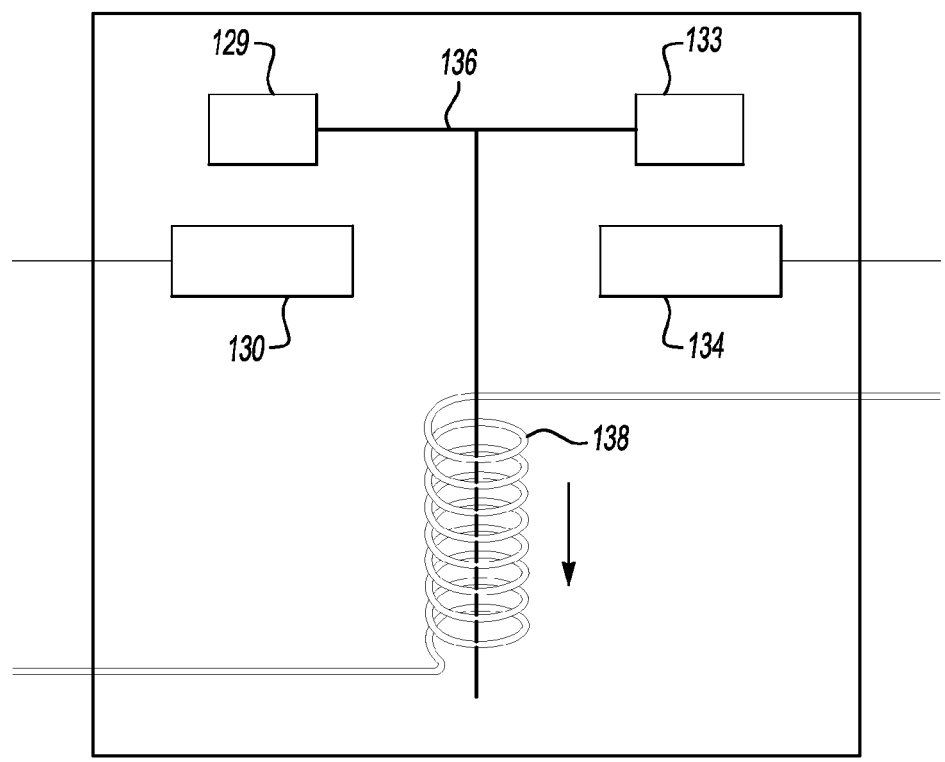
FIGS. 3A and 3B are side and top view, schematic diagrams of a double-pole single-throw contactor.
Figure 3B:
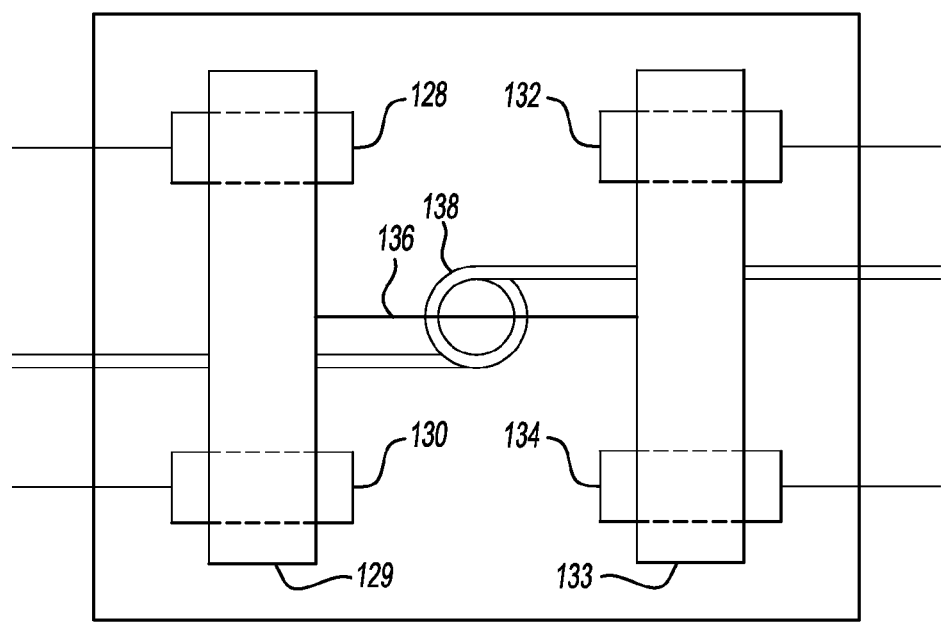

Referring now to FIGS. 3A and 3B, a double-pole single-throw contactor may include contacts 128, 130, 132, 134, poles 129, 133, a spring-loaded plunger 136 and a coil 138. The plunger 136 is mechanically connected with the poles 129, 133. As known in the art, passing a current through the coil 138 will generate an electromagnetic field that causes the plunger 136 to move such that the pole 129 touches the contacts 128, 130, and the pole 133 touches the contacts 132, 134 respectively.

Referring now to FIGS. 2, 3A and 3B, if the contactor of FIGS. 3A and 3B were to be used as the contactor 126 of FIG. 2 (the contacts 128, 130 may be electrically connected with the low side of the power source 114 and the low side of the high voltage bus 116 respectively; the contacts 132, 134 may be electrically connected with the high side of the power source 114 and the high side of the high voltage bus 116 respectively), the system 110 could not be properly precharged as the high side and low side of the power source 114 would be simultaneously connected with the high voltage bus 116 upon activation of the plunger 136.

Figure 4A:
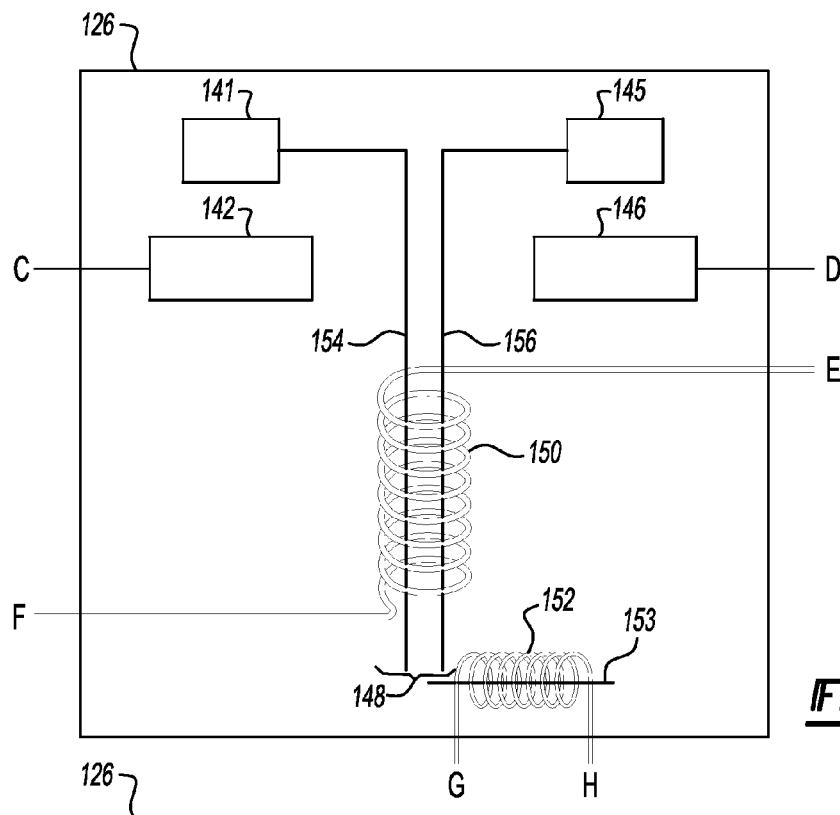
FIGS. 4A and 4B are side and top view, schematic diagrams of another double-pole single-throw contactor.
Figure 4B:
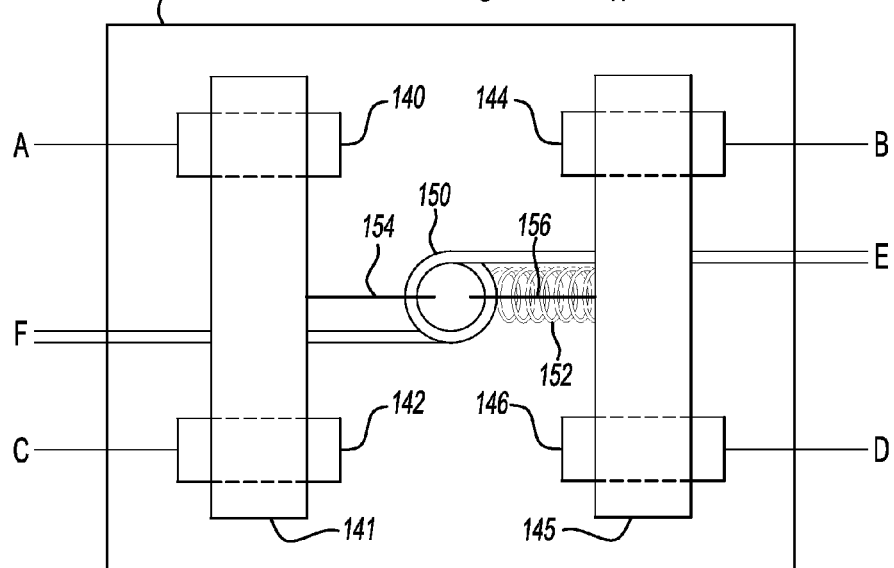

Referring now to FIGS. 2, 4A and 4B, the double-pole single-throw contactor 126 may include contacts 140, 142, 144, 146, poles 141, 145, a split (or dual) plunger 148 (of any shape/configuration), coils 150, 152, and a moveable spring-loaded pin 153. The coil 150 is wound around the split plunger 148. The coil 152 is wound around the moveable spring-loaded pin 153.

The contact 140 may be electrically connected with the battery's low side (as designated by "A"). The contact 142 may be electrically connected with the low side of the high voltage bus 116 (as designated by "C"). The contact 144 may be electrically connected with the battery's high side (as designated by "B"). The contact 146 may be electrically connected with the high side of the high voltage bus 116 (as designated by "D"). The coils 150, 152 may each be electrically connected with a low voltage source such as a +12 V battery, etc. (as designated by "E," "F," "G" and "H").

In the embodiment of FIGS. 4A and 4B, the split plunger 148 may be spring biased in the open position and include leg portions 154, 156. The leg portion 154 is mechanically connected with the pole 141. The leg portion 156 is mechanically connected with the pole 145. Passing a current through the coil 150 will generate an electromagnetic field that causes the leg portion 154 to move such that the pole 141 touches the contacts 140, 142. The same, however, is not necessarily true for the leg portion 156. The moveable spring-loaded pin 153, if engaged, may block the leg portion 156 from moving. As such, the poles 141, 145 may be sequentially closed via control of the moveable spring-loaded pin 153.

Figure 5:
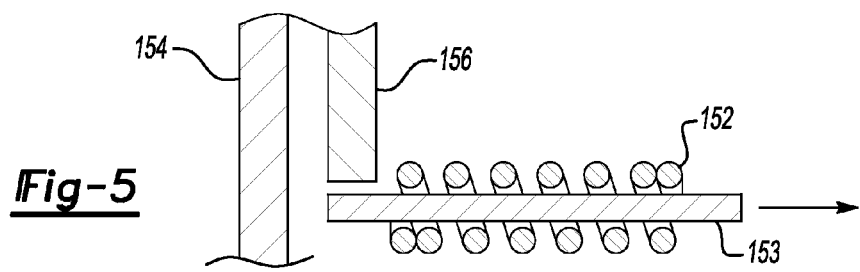
FIG. 5 is a schematic diagram, in cross-section, of an enlarged portion of the double-pole single-throw contactor of FIGS. 4A and 4B.

Referring now to FIG. 5, the moveable spring-loaded pin 153 may be spring biased such that if no current is passing through the coil 152, the pin 153 blocks movement of the leg portion 156. If, however, current is passing through the coil 152 (and the coil 150), the pin 153 may move such that it no longer blocks the path of the leg portion 156, and the leg portion may move such that the pole 145 touches the contacts 144, 146 illustrated in FIG. 4B.

In other embodiments, any suitable mechanical or electrical mechanism may be used to block/interfere with the movement of the leg portion 156. As an example, a mechanical lever may engage/disengage the leg portion 156. As another example, an electromagnet, a motor and gear arrangement, etc. may be used to move the mechanical mechanism. Other arrangements are, of course, also possible.

Referring again to FIGS. 2, 4A and 4B, the coil 150 may be energized (while the pin 153 is engaged with the leg portion 156) to cause the leg portion 154 to move such that the pole 141 touches the contacts 140, 142, and the contactor 124 may be closed to precharge the system 110. Once precharge of the system 110 is complete (e.g., when the voltage across the contactor 124 falls within an acceptable range and/or a predetermined period of time has based), the coil 152 may be energized to cause the spring-loaded pin 153 to disengage from the leg portion 156 and to allow the leg portion 156 to move such that the pole 145 touches the contacts 144, 146.

The contactor 124 may then be opened. Electrical power may thus flow from the power source 114 to loads electrically connected with the high voltage bus 116.

Those of ordinary skill will recognize that any suitable and/or known controller(s) may be arranged with the system 110 in order to control the contactors 124, 126. For example, one or more controllers may control the activation of the coils 150, 152 to achieve the sequential closing of the poles 141, 145 as described above.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle comprising:
   an electrical power source disposed within the vehicle;
   an electrical bus; and
   a double-pole, single-throw contactor electrically connected with the electrical power source and electrical bus, wherein the contactor includes two poles and a split plunger configured to sequentially close the poles.

2. The vehicle of claim 1 wherein the split plunger includes first and second leg portions and wherein the first leg portion is configured to close one of the poles and the second leg portion is configured to close the other of the poles.

3. The vehicle of claim 2 wherein the contactor further includes a mechanical element configured to selectively prevent movement of one of the first and second leg portions.

4. The vehicle of claim 3 wherein the contactor further includes an electromagnetic coil configured to cause the mechanical element to move if energized.

5. The vehicle of claim 2 wherein the contactor further includes an electromagnetic coil configured to cause at least one of the first and second leg portions to move if energized.

6. The vehicle of claim 5 wherein the coil is wound around the split plunger.

7. The vehicle of claim 1 wherein the power source is a battery.

8. A vehicle power system comprising:
   an electrical power source;
   an electrical bus; and
   a contactor electrically connected with the electrical power source and electrical bus, wherein the contactor includes (i) first and second poles, (ii) dual plungers each operatively associated with one of the first and second poles, and (iii) an electromagnetic coil configured to cause at least one of the dual plungers to move if the coil is energized.

9. The system of claim 8 wherein the contactor further includes a moveable mechanical element configured to selectively prevent movement of one of the dual plungers.

10. The system of claim 9 wherein the contactor further includes a second electromagnetic coil wound around the moveable mechanical element and configured to cause the mechanical element to move if energized.

11. The system of claim 8 wherein the coil is wound around the dual plungers.

12. The system of claim 8 wherein the power source is a battery.

13. The system of claim 9 wherein the moveable mechanical element is a spring-loaded pin.

* * * * *